May 29, 1951 G. G. LAVERY 2,554,834

COUPLING FOR TELEPHONE RECEIVERS
AND HEARING AID SETS
Filed June 29, 1948

INVENTOR
G. G. LAVERY
BY
G. H. Heydt
ATTORNEY

Patented May 29, 1951 2,554,834

UNITED STATES PATENT OFFICE 2,554,834

COUPLING FOR TELEPHONE RECEIVERS AND HEARING AID SETS

Grant G. Lavery, Summit, N. J., assignor to Bell Telephone Laboratories, Incorporated, New York, N. Y., a corporation of New York Application June 29, 1948, Serial No. 35,893

4 Claims. (Cl. 179—107)

This invention relates to hearing aids for the hard of hearing, and more particularly to means for relaying and amplifying telephone currents so as to enable persons who are hard of hearing to hear speech or other sounds transmitted by telephone.

The present invention provides means other than acoustic coupling for relaying the output of a conventional telephone receiver to the electronic amplifier of a conventional hearing aid set.

According to this invention the stray magnetic flux representing the voice current supplied to the telephone receiver may be coupled to the amplifier of the hearing aid by means of an inductive pick-up device which comprises a pick-up coil mounted as an integral part of the hearing aid receiver assembly.

As is well known, several steps have already been taken to provide assistance for the hard of hearing who wish to use a standard telephone set. Some degree of assistance may be obtained by the use of an auxiliary amplifier and loudspeaker, by the use of a telephone set with a self-contained amplifier, and by the various methods of acoustically coupling the telephone receiver to the hearing aid transmitter. Each of these methods, however, presents some disadvantage which may be found either in the added cost of the auxiliary equipment, the distortion products introduced by acoustic coupling, or the masking effect caused by the hearing aid transmitter picking up room noise.

In conventional telephone receiver design a relatively small percentage (in the order of 30 per cent) of the total magnetic flux appears across the air gaps. Conversely, a relatively large leakage flux appears outside of the magnetic circuit proper, some of this flux being external to the non-magnetic receiver housing. This leakage flux consists of the direct current, steady state, magnet flux, and an alternating current flux component produced by the voice current supplied to the receiver. It has been found that by coupling a wire wound coil to the telephone receiver leakage flux which is external to the non-magnetic receiver housing, the message content of the voice current can be detected without resorting to any acoustic output of the receiver proper. Moreover, the message content detected in this manner will have little, if any, of the distortion products which would be introduced by an acoustic coupling between the telephone receiver and the hearing aid transmitter and there will be no masking effect due to the transmitter picking up room noise.

In accordance with the general features of this invention the inductive pick-up coil is as small and inconspicuous as satisfactory functioning of the hearing aid set will permit. It involves no extra parts to be handled or adjusted by the user, and its location permits placing the telephone receiver, or conventional combined handset, up to the head in the same manner as commonly employed by individuals with normal hearing. The sensitivity of the pick-up coil is such that little change in the gain setting of the hearing aid amplifier is involved in changing from normal aural pick-up to the inductive telephone pick-up. The sensitivity of the pick-up coil is greatly enhanced by a suitable magnetic core which may be either in the form of an auxiliary core or the magnetic structure of the hearing aid receiver. The orientation of the pick-up coil with respect to the magnetic fields of the hearing aid receiver is such as will minimize the magnetic coupling between these two portions of the hearing aid circuit.

These and other features of the invention will be more clearly understood from the following detailed description and the accompanying drawings in which.

Figures 1, 2, 3:
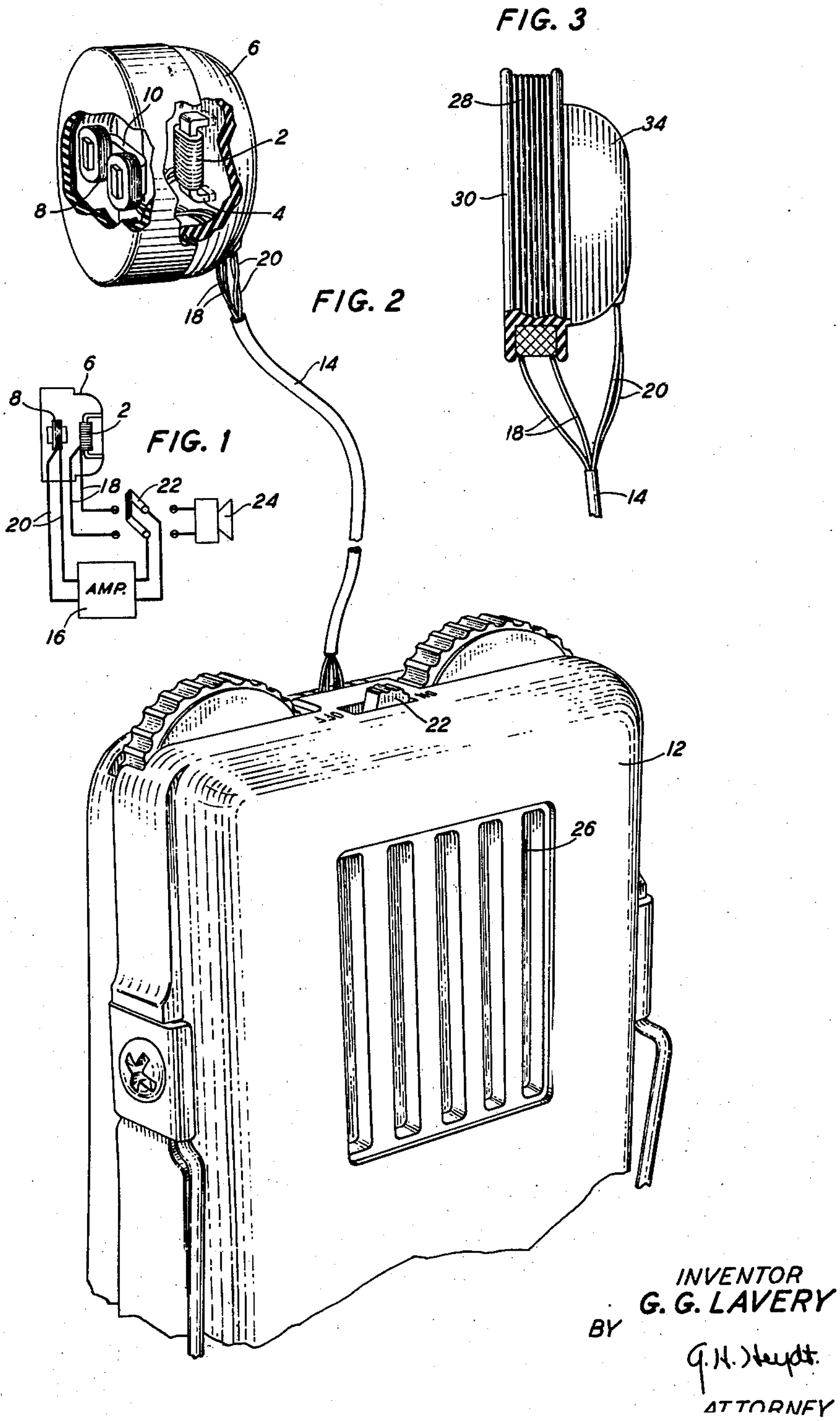
Fig. 1 shows diagrammatically an embodiment of this invention.
Fig. 2 is a view in perspective of a hearing aid according to this invention with a sectional view showing the relative positions of the inductive pick-up and receiver magnetic systems.
Fig. 3 is a view in side elevation of one embodiment according to the invention wherein the inductive pick-up coil is coaxially mounted on the hearing aid receiver.

As shown in Figs. 1 and 2, wherein like reference characters designate similar elements, the inductive pick-up device 2 which comprises a coil of wire preferably wound on an iron core 4 is mounted within the plastic housing of the hearing aid receiver 6. The mounting may be accomplished by embedding the ends of the core 4 in the receiver housing proper. The receiver 6 may be a conventional bipolar magnetic type, or other suitable magnetic type, with the magnetic system 8 mounted in the conventional manner. In order to minimize magnetic coupling between the magnetic systems of the pick-up device and the hearing aid receiver, the core 4 of the pick-up device is positioned so that its axis will be at an angle of 90 degrees with respect to the axis of the magnetic core 10 of the receiver.

Connections to the hearing aid set 12 are made by means of a four conductor flexible cord 14. A three conductor cord with a common ground may also be used for this purpose. The signal picked up by the device 2 is transmitted to the conventional amplifier 16 normally housed in the set 12 by means of the conductors 18 and the switch 22, while the output of the amplifier 16 is fed to the magnetic system 8 of the receiver by means of the conductors 20. The input to the amplifier 16 may be selectively connected through the switch 22 either to the transmitter 24 normally positioned behind the grille 26 of the set 12 or to the inductive pick-up device 2. By disconnecting the transmitter of the hearing aid when using the inductive pick-up device the masking effect of the aural pick-up is eliminated.

As shown in Fig. 3 the inductive pick-up device may be constructed by coaxially mounting a pick-up coil 28, which consists of small gauge wire turns, on a hearing aid receiver 34 which may be a bipolar magnetic type similar to receiver 6 shown in Fig. 2. The wire turns of coil 28 are wound on the spool 30 which may be attached to the receiver in any conventional manner or may be included in the receiver housing structure. In order to enhance the sensitivity of the coil 28 it is so positioned with respect to the receiver 34 that the magnetic structure of the receiver 34 will serve as a magnetic core for the coil 28.

While modifications in the structures shown may occur to those skilled in the art, the invention is intended to be limited only by the scope of the following claims.

What is claimed is:

1. In a hearing aid device including an amplifier having input and output terminals, a receiver unit supportable by the ear of the user comprising a casing, a magnetic type receiver element housed in said casing, and an inductively responsive pick-up element mounted on said casing and electrically connected to said receiver element, means including electrical conductors for connecting said inductively responsive element to the input terminals of said amplifier, means including electrical conductors for connecting said receiver element to the output terminals of said amplifier.

2. In a hearing aid device including an amplifier having input and output terminals, a receiver unit supportable by the ear of the user comprising a casing, a magnetic type receiver element mounted in that portion of said casing which is normally positioned close to the ear, and an inductively responsive pick-up element mounted behind said receiver element in that portion of said casing which is normally removed from the ear, each of said elements comprising a magnetic core with at least one coil wound thereon, the axis of one of said cores being substantially at an angle of 90 degrees with respect to the axis of said other core, means including electrical conductors for connecting said inductively responsive element to the input terminals of said amplifier, means including electrical conductors for connecting said receiver element to the output terminals of said amplifier.

3. In a hearing aid device including an amplifier having input and output terminals, a receiver unit supportable by the ear of the user comprising a casing, a magnetic type receiver element including a magnetic core mounted in said casing, and an inductively responsive pick-up coil wound around said casing, said receiver element core serving as a core for said inductively responsive coil, means including electrical conductors for connecting said inductively responsive coil to the input terminals of said amplifier, means including electrical conductors for connecting said receiver element to the output terminals of said amplifier.

4. In a hearing aid device including an amplifier having input and output terminals, a receiver unit supportable by the ear of the user comprising a casing, a spool coaxially mounted on said casing, a magnetic type receiver element including a magnetic core mounted within said casing, and an inductively responsive pick-up coil wound on said spool, said receiver element core serving as a core for said inductively responsive coil, means including electrical conductors for connecting said inductively responsive coil to the input terminals of said amplifier, means including electrical conductors for connecting said receiver element to the output terminals of said amplifier.

GRANT G. LAVERY.

REFERENCES CITED

The following references are of record in the file of this patent:

UNITED STATES PATENTS

| Number | Name | Date |
|---|---|---|
| 529,174 | Higgins | Nov. 13, 1894 |
| 1,602,759 | Dyer | Oct. 12, 1926 |
| 1,928,669 | Lybarger | Oct. 3, 1933 |
| 2,005,973 | Hellman | June 25, 1935 |
| 2,160,829 | Cherry | June 6, 1939 |
| 2,204,529 | Cooley | June 11, 1940 |
| 2,268,665 | Loewe | Jan. 6, 1942 |
| 2,348,138 | Latus et al. | May 2, 1944 |
| 2,409,481 | Fordham | Oct. 15, 1946 |
| 2,485,405 | Olney et al. | Oct. 18, 1949 |

FOREIGN PATENTS

| Number | Country | Date |
|---|---|---|
| 107,903 | Australia | July 20, 1939 |
| 495,171 | Great Britain | Nov. 8, 1938 |
| 589,918 | Great Britain | July 3, 1947 |